US008234054B2

(12) United States Patent
Nakasaka et al.

(10) Patent No.: US 8,234,054 B2
(45) Date of Patent: Jul. 31, 2012

(54) METHOD OF OPERATING A SPARK IGNITION TYPE INTERNAL COMBUSTION ENGINE

(75) Inventors: Yukihiro Nakasaka, Shizuoka (JP); Daisaku Sawada, Gotenba (JP); Daisuke Akihisa, Susono (JP); Eiichi Kamiyama, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 697 days.

(21) Appl. No.: 12/514,534

(22) PCT Filed: Oct. 26, 2007

(86) PCT No.: PCT/JP2007/071362
§ 371 (c)(1),
(2), (4) Date: May 12, 2009

(87) PCT Pub. No.: WO2008/068985
PCT Pub. Date: Jun. 12, 2008

(65) Prior Publication Data
US 2010/0131170 A1    May 27, 2010

(30) Foreign Application Priority Data

Dec. 4, 2006   (JP) .................. 2006-327343

(51) Int. Cl.
*G06F 19/00*    (2011.01)
*F02D 41/06*    (2006.01)
*F02D 43/00*    (2006.01)
*F01L 1/34*    (2006.01)
*F02B 75/04*    (2006.01)

(52) U.S. Cl. ................ 701/113; 123/179.18; 123/90.15; 123/316; 123/78 C

(58) Field of Classification Search ............... 123/90.11, 123/90.15–90.18, 78 R, 78 C, 179.16, 179.18, 123/182.1, 316; 701/101–103, 113
See application file for complete search history.

(56) References Cited

U.S. PATENT DOCUMENTS

| 3,786,792 | A * | 1/1974 | Pelizzoni et al. | 123/90.16 |
| 6,561,145 | B1 * | 5/2003 | Stockhausen et al. | 123/90.15 |
| 7,287,500 | B2 * | 10/2007 | Izumi et al. | 123/179.18 |
| 7,661,403 | B2 * | 2/2010 | Izumi | 123/179.16 |
| 2003/0182047 | A1 | 9/2003 | Boyer et al. | |
| 2003/0213451 | A1 | 11/2003 | Aoyama et al. | |
| 2005/0087155 | A1 | 4/2005 | Kikori | |
| 2005/0087169 | A1 | 4/2005 | Yoshida et al. | |
| 2005/0205029 | A1 | 9/2005 | Takemura et al. | |
| 2006/0102127 | A1 | 5/2006 | Izumi et al. | |
| 2007/0251481 | A1 | 11/2007 | Izumi et al. | |

FOREIGN PATENT DOCUMENTS

| EP | 1 348 853 | 10/2003 |
| EP | 1 363 002 | 11/2003 |
| EP | 1 526 265 | 4/2005 |

(Continued)

*Primary Examiner* — Willis Wolfe, Jr.
(74) *Attorney, Agent, or Firm* — Oblon, Spivak, McClelland, Maier & Neustadt, L.L.P.

(57) ABSTRACT

An engine provided with a variable timing mechanism (B) able to control a closing timing of an intake valve (7) and a variable compression ratio mechanism (A) able to change a mechanical compression ratio. At the time of engine startup, the closing timing of the intake valve (7) is made the most delayed position so that the least intake air is fed to the inside of the combustion chamber (5) and the mechanical compression ratio is made the maximum compression ratio.

7 Claims, 10 Drawing Sheets

FOREIGN PATENT DOCUMENTS

| | | |
|---|---|---|
| EP | 1 526 277 | 4/2005 |
| EP | 1 577 511 | 9/2005 |
| JP | 2002-276446 | 9/2002 |
| JP | 2004 183570 | 7/2004 |
| JP | 2005 30253 | 2/2005 |
| JP | 2005-127239 | 5/2005 |
| JP | 2006 77605 | 3/2006 |
| JP | 2006 118517 | 5/2006 |
| JP | 2006 138299 | 6/2006 |
| WO | 2007 138794 | 12/2007 |

* cited by examiner

FIG.2
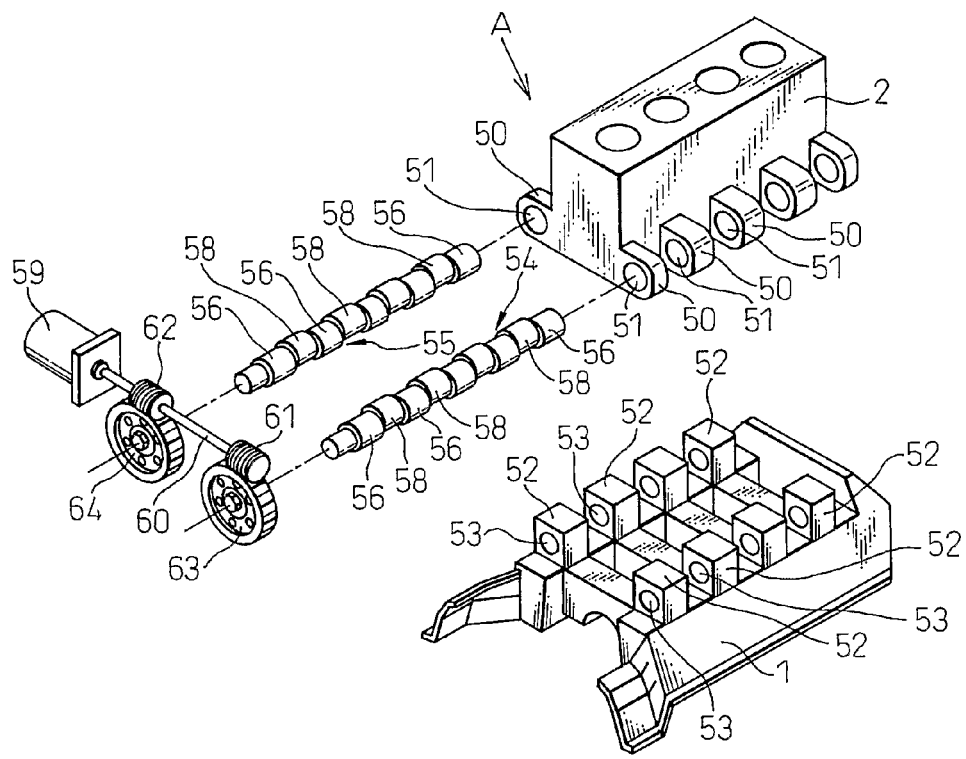
FIG.3
(A) 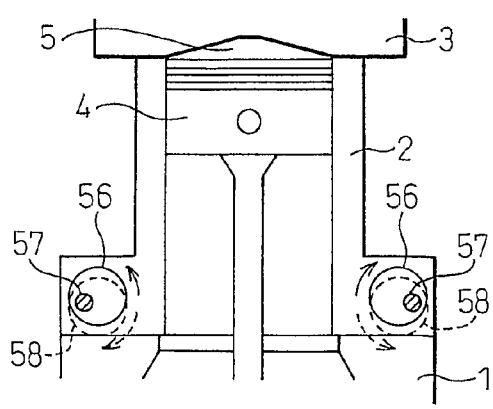
(B) 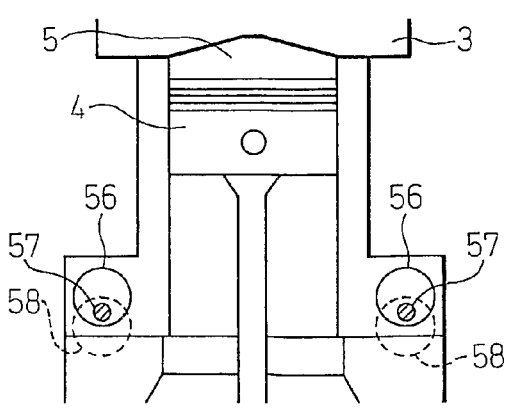

FIG.6
(A)
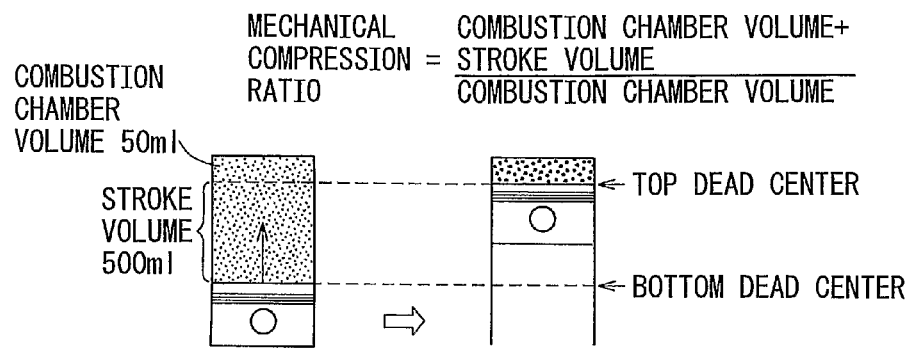
(B)
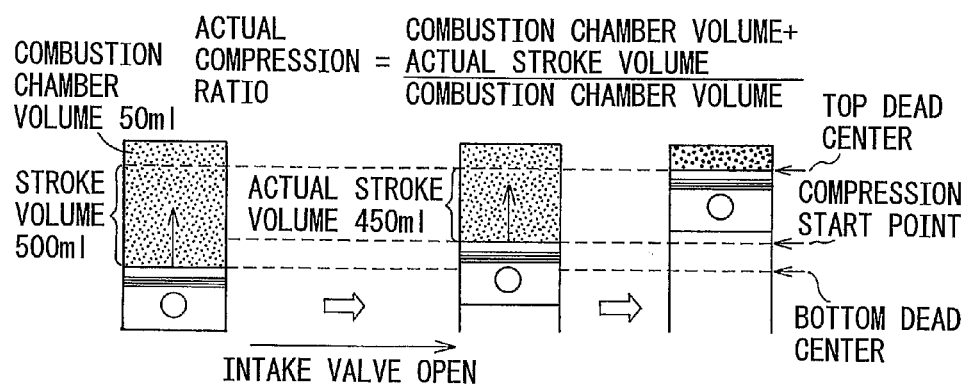
(C)
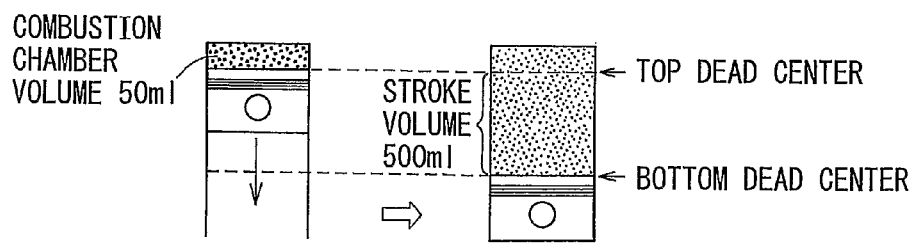

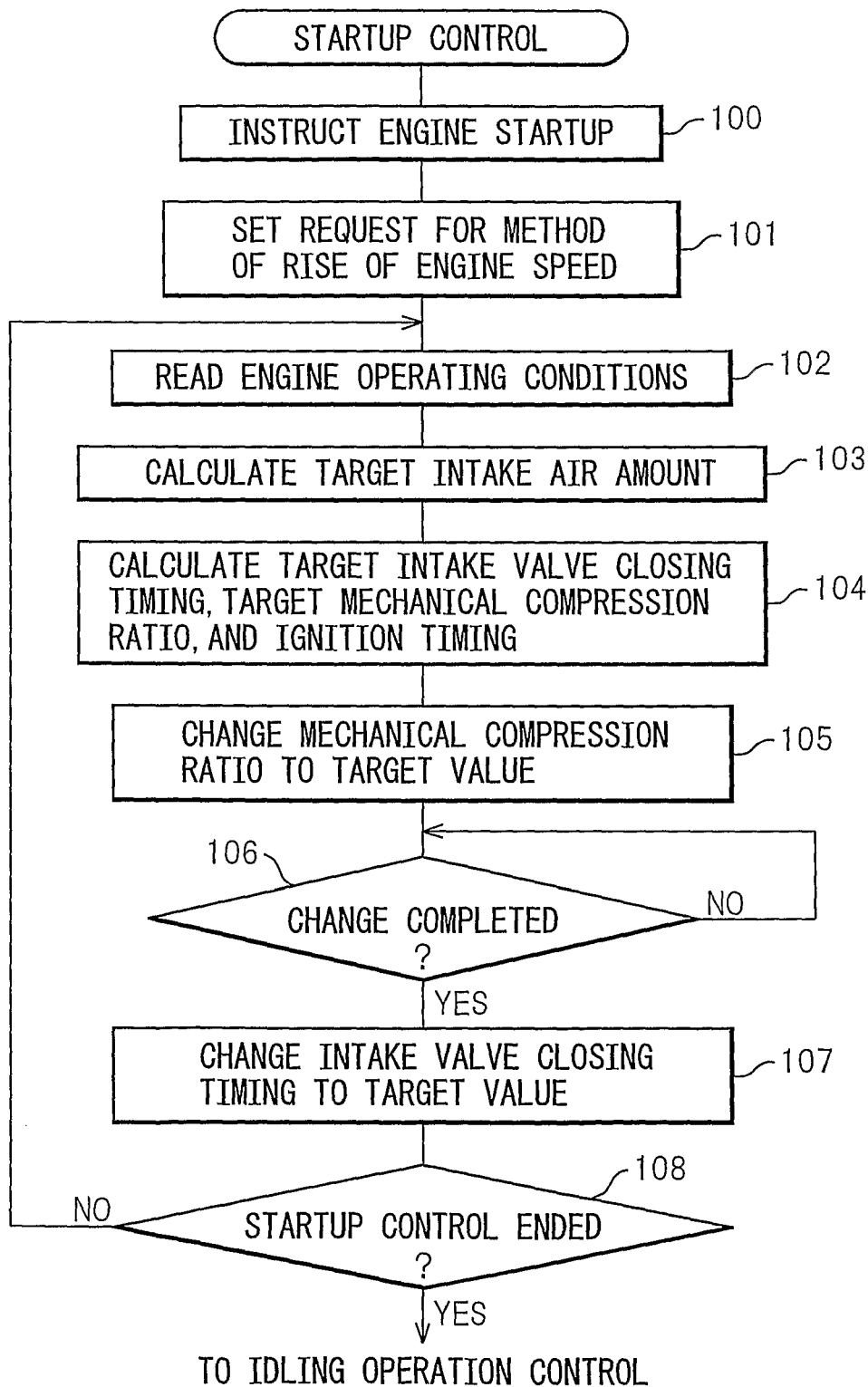

METHOD OF OPERATING A SPARK IGNITION TYPE INTERNAL COMBUSTION ENGINE

TECHNICAL FIELD

The present invention relates to a method of operating a spark ignition type internal combustion engine.

BACKGROUND ART

In an internal combustion engine, the more delayed the closing timing of the intake valve, in other words, the more the closing timing of the intake valve approaches compression top dead center, the greater the amount of intake air pushed back from inside the combustion chamber to the inside of the intake port at the time of the compression stroke and therefore the less the amount of air sealed in the combustion chamber, that is, the amount of intake air fed into the combustion chamber. Therefore, by controlling the closing timing of the intake valve, the amount of intake air fed into the combustion chamber can be controlled.

Therefore, known in the art is a spark ignition type internal combustion engine provided with a variable timing mechanism able to control a closing timing of an intake valve and controlling the closing timing of the intake valve at the time of engine startup so that the amount of intake air required for startup is fed into the combustion chamber (for example, see Japanese Patent Publication (A) No. 2006-138299). In this internal combustion engine, when the engine is started up and the engine speed is rising, the engine speed is prevented from rising greatly exceeding a target idling speed at the time of engine startup, that is, the engine speed is prevented from overshooting as much as possible at the time of engine startup, by changing the closing timing of the intake valve so as to control the amount of intake air fed into the combustion chamber.

However, even if changing the closing timing of the intake valve in this way so as to control the amount of intake air fed into the combustion chamber, it is not possible to prevent overshoot of the engine speed at the time of engine startup.

That is, in the above-mentioned internal combustion engine, at the time of engine startup, it is necessary to reduce the amount of intake air fed into the combustion chamber to a small amount so as to prevent the engine speed from overshooting. For this, at the time of engine startup, it is necessary to delay the closing timing of the intake valve considerably. However, if delaying the closing timing of the intake valve, the timing at which the compression action is actually started becomes delayed, so the actual compression ratio ends up falling and ignition ends up becoming impossible.

Therefore, in the above-mentioned internal combustion engine, to raise the actual compression ratio for ignition, it is necessary to advance the closing timing of the intake valve beyond the optimum closing timing for preventing overshoot. As a result, the engine speed inevitably overshoots at the time of engine startup. Therefore, as explained above, even if changing the closing timing of the intake valve to control the amount of intake air fed into the combustion chamber, it is not possible to prevent overshoot of the engine speed at the time of engine startup.

DISCLOSURE OF THE INVENTION

An object of the present invention is to provide a method of operating a spark ignition type internal combustion engine able to give reliable ignition at the time of engine startup and an action raising the desired engine speed.

According to the present invention, there is provided a method of operating a spark ignition type internal combustion engine provided with a variable timing mechanism able to control a closing timing of an intake valve and a variable compression ratio mechanism able to change a mechanical compression ratio, characterized in that at the time of engine startup, the closing timing of the intake valve is controlled so that the amount of intake air required for startup is fed to the inside of the combustion chamber, and the mechanical compression ratio is made the high compression ratio side.

BRIEF DESCRIPTION OF THE DRAWINGS

FIG. 2 is a disassembled perspective view of a variable compression ratio mechanism.
FIG. 3 is a side cross-sectional view of the illustrated internal combustion engine.
FIG. 6 is a view for explaining the engine compression ratio, actual compression ratio, and expansion ratio.
FIG. 12 is a flowchart for carrying out the start control.

BEST MODE FOR CARRYING OUT THE INVENTION

Figure 1:
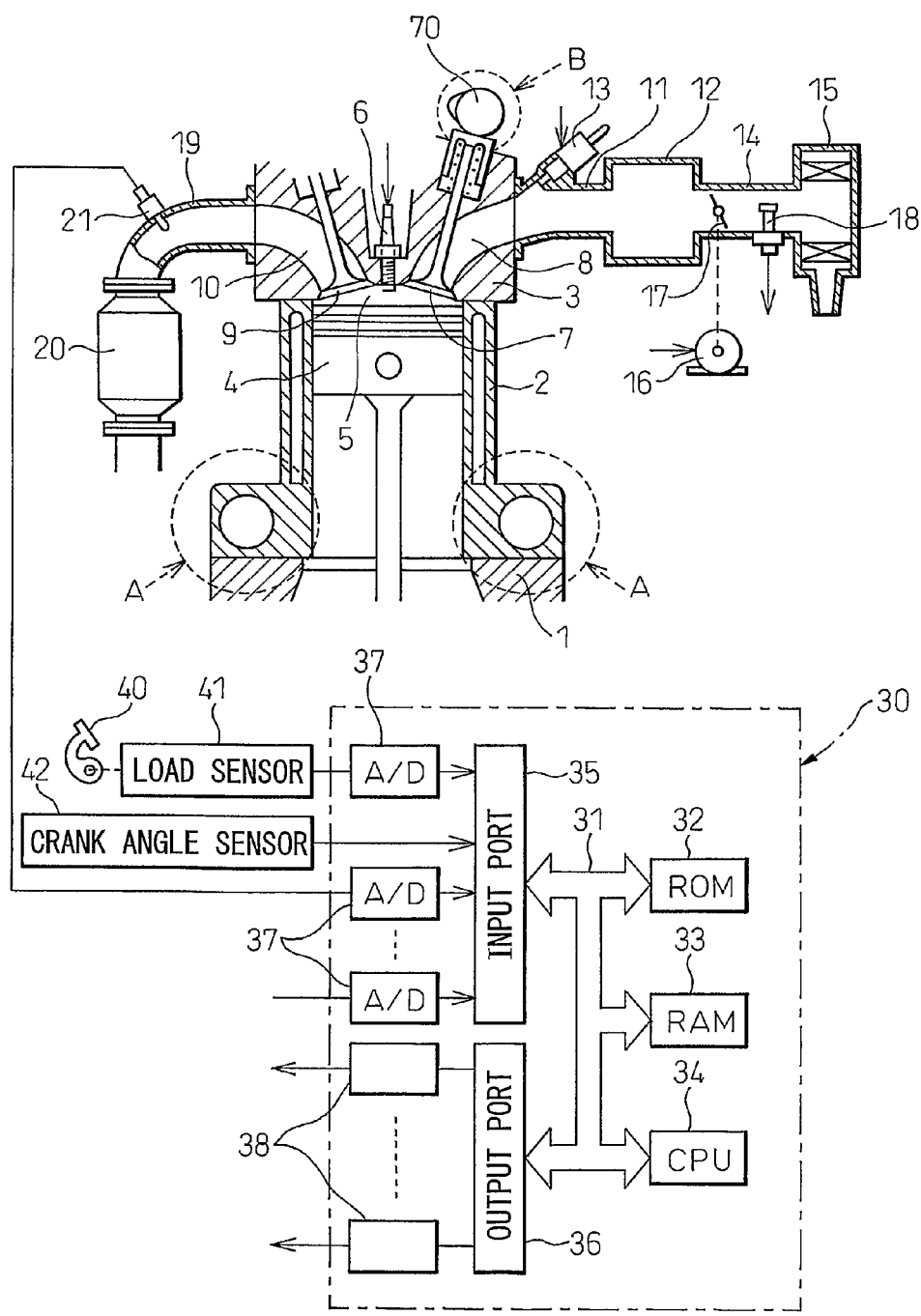
FIG. 1 is an overview of a spark ignition type internal combustion engine.

FIG. 1 shows a side cross-sectional view of a spark ignition type internal combustion engine.

Referring to FIG. 1, 1 indicates a crank case, 2 a cylinder block, 3 a cylinder head, 4 a piston, 5 a combustion chamber, 6 a spark plug arranged at the top center of the combustion chamber 5, 7 an intake valve, 8 an intake port, 9 an exhaust valve, and 10 an exhaust port. The intake port 8 is connected through an intake branch tube 11 to a surge tank 12, while each intake branch tube 11 is provided with a fuel injector 13 for injecting fuel toward a corresponding intake port 8. Note that each fuel injector 13 may be arranged at each combustion chamber 5 instead of being attached to each intake branch tube 11.

The surge tank 12 is connected through an intake duct 14 to an air cleaner 15, while the intake duct 14 is provided inside it with a throttle valve 17 driven by an actuator 16 and an intake air amount detector 18 using for example a hot wire. On the other hand, the exhaust port 10 is connected through an exhaust manifold 19 to a catalytic converter 20 housing for example a three-way catalyst, while the exhaust manifold 19 is provided inside it with an air-fuel ratio sensor 21. Note that various sensors (not shown in FIG. 1) such as an atmospheric pressure sensor, a water temperature sensor, an oil temperature sensor, a vacuum sensor for detecting a pressure in the surge tank 12, etc. are attached to the engine.

On the other hand, in the embodiment shown in FIG. 1, the connecting part of the crank case 1 and the cylinder block 2 is provided with a variable compression ratio mechanism A able to change the relative positions of the crank case 1 and cylinder block 2 in the cylinder axial direction so as to change the volume of the combustion chamber 5 when the piston 4 is positioned at compression top dead center, and there is further provided with an actual compression action start timing changing mechanism B able to change a start timing of an actual compression action. Note that in the embodiment shown in FIG. 1, this actual compression action start timing changing mechanism B is comprised of a variable valve timing mechanism able to control the closing timing of the intake valve 7.

The electronic control unit 30 is comprised of a digital computer provided with components connected with each other through a bidirectional bus 31 such as a ROM (read only memory) 32, RAM (random access memory) 33, CPU (microprocessor) 34, input port 35, and output port 36. The output signal of the intake air amount detector 18 and the output signal of the air-fuel ratio sensor 21 are input through corresponding AD converters 37 to the input port 35. Further, the accelerator pedal 40 is connected to a load sensor 41 generating an output voltage proportional to the amount of depression L of the accelerator pedal 40. The output voltage of the load sensor 41 is input through a corresponding AD converter 37 to the input port 35. Further, the input port 35 is connected to a crank angle sensor 42 generating an output pulse every time the crankshaft rotates by for example 30°. On the other hand, the output port 36 is connected through the drive circuit 38 to a spark plug 6, fuel injector 13, throttle valve drive actuator 16, variable compression ratio mechanism A, and variable valve timing mechanism B.

FIG. 2 is a disassembled perspective view of the variable compression ratio mechanism A shown in FIG. 1, while FIG. 3 is a side cross-sectional view of the illustrated internal combustion engine. Referring to FIG. 2, at the bottom of the two side walls of the cylinder block 2, a plurality of projecting parts 50 separated from each other by a certain distance are formed. Each projecting part 50 is formed with a circular cross-section cam insertion hole 51. On the other hand, the top surface of the crank case 1 is formed with a plurality of projecting parts 52 separated from each other by a certain distance and fitting between the corresponding projecting parts 50. These projecting parts 52 are also formed with circular cross-section cam insertion holes 53.

As shown in FIG. 2, a pair of cam shafts 54, 55 is provided. Each of the cam shafts 54, 55 has circular cams 56 fixed on it able to be rotatably inserted in the cam insertion holes 51 at every other position. These circular cams 56 are coaxial with the axes of rotation of the cam shafts 54, 55. On the other hand, between the circular cams 56, as shown by the hatching in FIG. 3, extend eccentric shafts 57 arranged eccentrically with respect to the axes of rotation of the cam shafts 54, 55. Each eccentric shaft 57 has other circular cams 58 rotatably attached to it eccentrically. As shown in FIG. 2, these circular cams 58 are arranged between the circular cams 56. These circular cams 58 are rotatably inserted in the corresponding cam insertion holes 53.

When the circular cams 56 fastened to the cam shafts 54, 55 are rotated in opposite directions as shown by the solid line arrows in FIG. 3(A) from the state shown in FIG. 3(A), the eccentric shafts 57 move toward the bottom center, so the circular cams 58 rotate in the opposite directions from the circular cams 56 in the cam insertion holes 53 as shown by the broken line arrows in FIG. 3(A). As shown in FIG. 3(B), when the eccentric shafts 57 move toward the bottom center, the centers of the circular cams 58 move to below the eccentric shafts 57.

As will be understood from a comparison of FIG. 3(A) and FIG. 3(B), the relative positions of the crank case 1 and cylinder block 2 are determined by the distance between the centers of the circular cams 56 and the centers of the circular cams 58. The larger the distance between the centers of the circular cams 56 and the centers of the circular cams 58, the further the cylinder block 2 from the crank case 1. If the cylinder block 2 moves away from the crank case 1, the volume of the combustion chamber 5 when the piston 4 is positioned as compression top dead center increases, therefore by making the cam shafts 54, 55 rotate, the volume of the combustion chamber 5 when the piston 4 is positioned as compression top dead center can be changed.

As shown in FIG. 2, to make the cam shafts 54, 55 rotate in opposite directions, the shaft of a drive motor 59 is provided with a pair of worm gears 61, 62 with opposite thread directions. Gears 63, 64 engaging with these worm gears 61, 62 are fastened to ends of the cam shafts 54, 55. In this embodiment, the drive motor 59 may be driven to change the volume of the combustion chamber 5 when the piston 4 is positioned at compression top dead center over a broad range. Note that the variable compression ratio mechanism A shown from FIG. 1 to FIG. 3 shows an example. Any type of variable compression ratio mechanism may be used.

Figure 4:
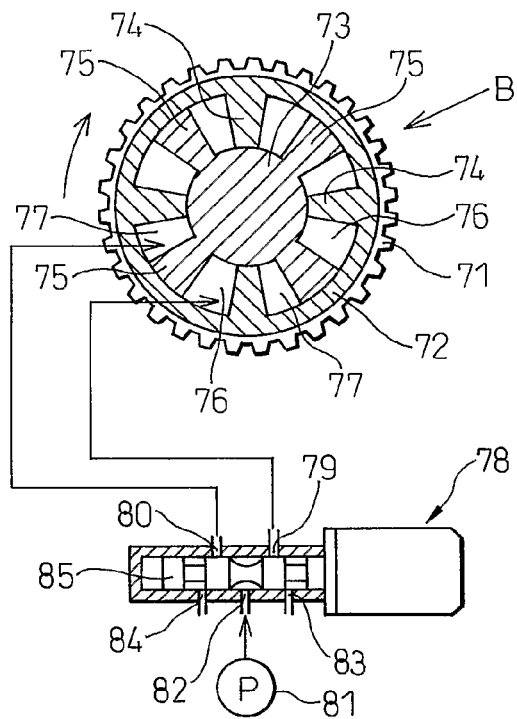
FIG. 4 is a view of a variable valve timing mechanism.

On the other hand, FIG. 4 shows a variable valve timing mechanism B attached to the end of the cam shaft 70 for driving the intake valve 7 in FIG. 1. Referring to FIG. 4, this variable valve timing mechanism B is provided with a timing pulley 71 rotated by an engine crank shaft through a timing belt in the arrow direction, a cylindrical housing 72 rotating together with the timing pulley 71, a shaft 73 able to rotate together with an intake valve drive cam shaft 70 and rotate relative to the cylindrical housing 72, a plurality of partitions 74 extending from an inside circumference of the cylindrical housing 72 to an outside circumference of the shaft 73, and vanes 75 extending between the partitions 74 from the outside circumference of the shaft 73 to the inside circumference of the cylindrical housing 72, the two sides of the vanes 75 formed with hydraulic chambers for advancing 76 and use hydraulic chambers for retarding 77.

The feed of working oil to the hydraulic chambers 76, 77 is controlled by a working oil feed control valve 78. This working oil feed control valve 78 is provided with hydraulic ports 79, 80 connected to the hydraulic chambers 76, 77, a feed port 82 for working oil discharged from a hydraulic pump 81, a pair of drain ports 83, 84, and a spool valve 85 for controlling connection and disconnection of the ports 79, 80, 82, 83, 84.

To advance the phase of the cams of the intake valve drive cam shaft 70, in FIG. 4, the spool valve 85 is made to move to the right, working oil fed from the feed port 82 is fed through the hydraulic port 79 to the hydraulic chambers for advancing 76, and working oil in the hydraulic chambers for retarding 77 is drained from the drain port 84. At this time, the shaft 73 is made to rotate relative to the cylindrical housing 72 in the arrow direction.

As opposed to this, to retard the phase of the cams of the intake valve drive cam shaft 70, in FIG. 4, the spool valve 85 is made to move to the left, working oil fed from the feed port 82 is fed through the hydraulic port 80 to the hydraulic chambers for retarding 77, and working oil in the hydraulic chambers for advancing 76 is drained from the drain port 83. At this time, the shaft 73 is made to rotate relative to the cylindrical housing 72 in the direction opposite to the arrows.

When the shaft 73 is made to rotate relative to the cylindrical housing 72, if the spool valve 85 is returned to the neutral position shown in FIG. 4, the operation for relative rotation of the shaft 73 is ended, and the shaft 73 is held at the relative rotational position at that time. Therefore, it is possible to use the variable valve timing mechanism B so as to advance or retard the phase of the cams of the intake valve drive cam shaft 70 by exactly the desired amount.

Figure 5:
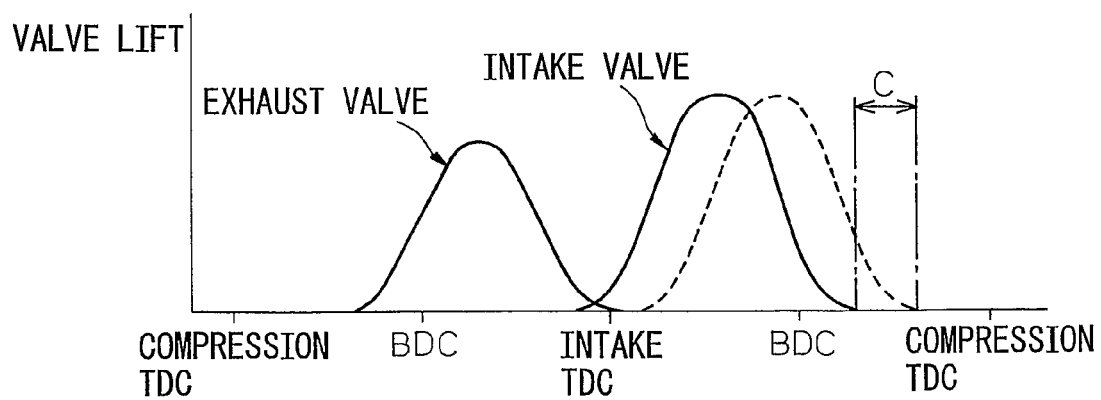
FIG. 5 is a view showing the amounts of lift of the intake valve and exhaust valve.

In FIG. 5, the solid line shows when the variable valve timing mechanism B is used to advance the phase of the cams of the intake valve drive cam shaft 70 the most, while the broken line shows when it is used to retard the phase of the cams of the intake valve drive cam shaft 70 the most. Therefore, the opening time of the intake valve 7 can be freely set between the range shown by the solid line in FIG. 5 and the range shown by the broken line, therefore the closing timing of the intake valve 7 can be set to any crank angle in the range shown by the arrow C in FIG. 5.

The variable valve timing mechanism B shown in FIG. 1 and FIG. 4 is one example. For example, a variable valve timing mechanism or other various types of variable valve timing mechanisms able to change only the closing timing of the intake valve while maintaining the opening timing of the intake valve constant can be used.

Next, the meaning of the terms used in the present application will be explained with reference to FIG. 6. Note that FIGS. 6(A), (B), and (C) show for explanatory purposes an engine with a volume of the combustion chambers of 50 ml and a stroke volume of the piston of 500 ml. In these FIGS. 6(A), (B), and (C), the combustion chamber volume shows the volume of the combustion chamber when the piston is at compression top dead center.

FIG. 6(A) explains the mechanical compression ratio. The mechanical compression ratio is a value determined mechanically from the stroke volume of the piston and combustion chamber volume at the time of a compression stroke. This mechanical compression ratio is expressed by (combustion chamber volume+stroke volume)/combustion. chamber volume. In the example shown in FIG. 6(A), this mechanical compression ratio becomes (50 ml+500 ml)/50 ml=11.

FIG. 6(B) explains the actual compression ratio. This actual compression ratio is a value determined from the actual stroke volume of the piston from when the compression action is actually started to when the piston reaches top dead center and the combustion chamber volume. This actual compression ratio is expressed by (combustion chamber volume+actual stroke volume)/combustion chamber volume. That is, as shown in FIG. 6(B), even if the piston starts to rise in the compression stroke, no compression action is performed while the intake valve is opened. The actual compression action is started after the intake valve closes. Therefore, the actual compression ratio is expressed as follows using the actual stroke volume. In the example shown in FIG. 6(B), the actual compression ratio becomes (50 ml+450 ml)/50 ml=10.

FIG. 6(C) explains the expansion ratio. The expansion ratio is a value determined from the stroke volume of the piston at the time of an expansion stroke and the combustion chamber volume. This expansion ratio is expressed by the (combustion chamber volume+stroke volume)/combustion chamber volume. In the example shown in FIG. 6(C), this expansion ratio becomes (50 ml+500 ml)/50 ml=11.

Next, the superhigh expansion ratio cycle used in the present invention will be explained with reference to FIG. 7 and FIG. 8. Note that FIG. 7 shows the relationship between the theoretical thermal efficiency and the expansion ratio, while FIG. 8 shows a comparison between the ordinary cycle and superhigh expansion ratio cycle used selectively in accordance with the load.

FIG. 8(A) shows the ordinary cycle when the intake valve closes near the bottom dead center and the compression action by the piston is started from near substantially compression bottom dead center. In the example shown in this FIG. 8(A) as well, in the same way as the examples shown in FIGS. 6(A), (B), and (C), the combustion chamber volume is made 50 ml, and the stroke volume of the piston is made 500 ml. As will be understood from FIG. 8(A), in an ordinary cycle, the mechanical compression ratio is (50 ml+500 ml)/50 ml=11, the actual compression ratio is also about 11, and the expansion ratio also becomes (50 ml+500 ml)/50 ml=11. That is, in an ordinary internal combustion engine, the mechanical compression ratio and actual compression ratio and the expansion ratio become substantially equal.

Figure 7:
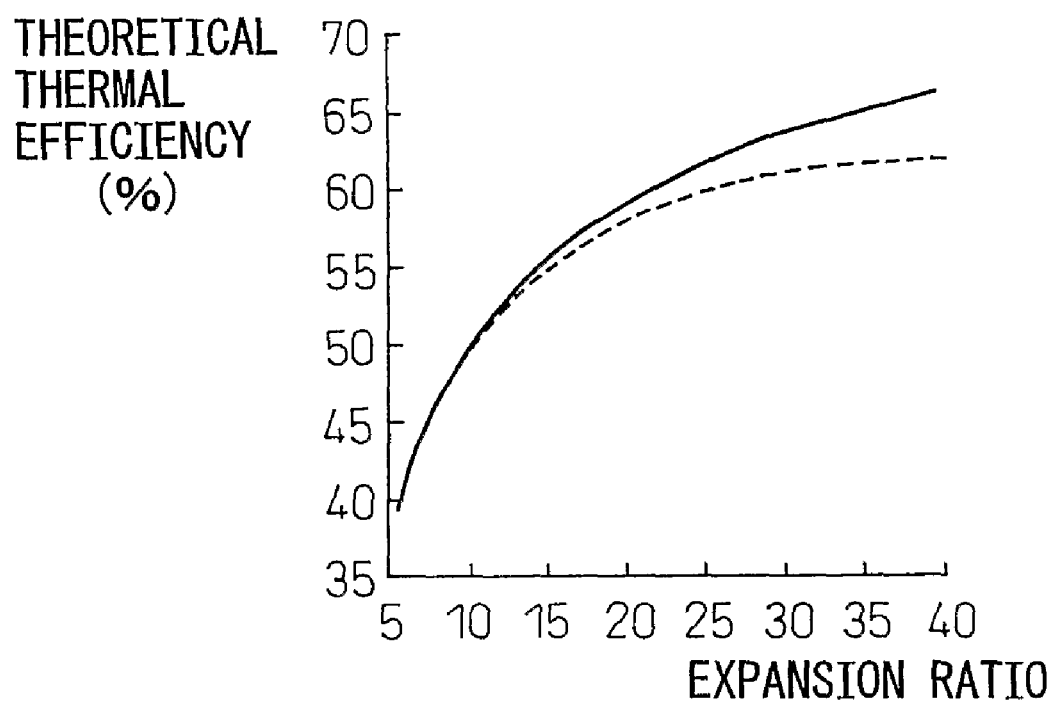
FIG. 7 is a view showing the relationship between the theoretical thermal efficiency and expansion ratio.
Figure 8:
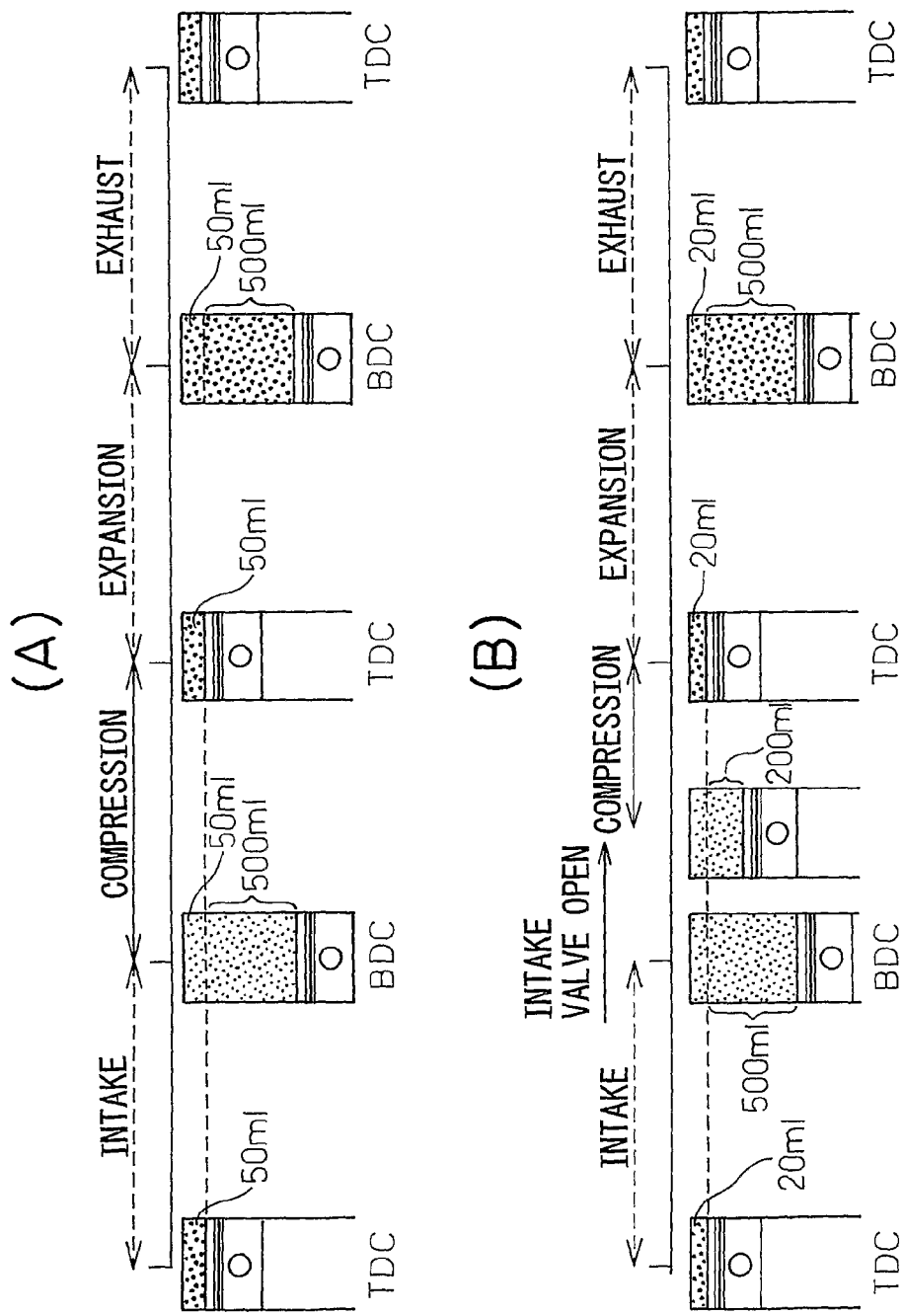
FIG. 8 is a view for explaining an ordinary cycle and superhigh expansion ratio cycle.

The solid line in FIG. 7 shows the change in the theoretical thermal efficiency in the case where the actual compression ratio and expansion ratio are substantially equal, that is, in the ordinary cycle. In this case, it is learned that the larger the expansion ratio, that is, the higher the actual compression ratio, the higher the theoretical thermal efficiency. Therefore, in an ordinary cycle, to raise the theoretical thermal efficiency, the actual compression ratio should be made higher. However, due to the restrictions on the occurrence of knocking at the time of engine high load operation, the actual compression ratio can only be raised even at the maximum to about 12, accordingly, in an ordinary cycle, the theoretical thermal efficiency cannot be made sufficiently high.

On the other hand, under this situation, the inventors strictly differentiated between the mechanical compression ratio and actual compression ratio and studied the theoretical thermal efficiency and as a result discovered that in the theoretical thermal efficiency, the expansion ratio is dominant, and the theoretical thermal efficiency is not affected much at all by the actual compression ratio. That is, if raising the actual compression ratio, the explosive force rises, but compression requires a large energy, accordingly even if raising the actual compression ratio, the theoretical thermal efficiency will not rise much at all.

As opposed to this, if increasing the expansion ratio, the longer the period during which a force acts pressing down the piston at the time of the expansion stroke, the longer the time that the piston gives a rotational force to the crankshaft. Therefore, the larger the expansion ratio is made, the higher the theoretical thermal efficiency becomes. The broken line in FIG. 7 shows the theoretical thermal efficiency in the case of fixing the actual compression ratio at 10 and raising the expansion ratio in that state. In this way, it is learned that the amount of rise of the theoretical thermal efficiency when raising the expansion ratio in the state where the actual compression ratio is maintained at a low value and the amount of rise of the theoretical thermal efficiency in the case where the actual compression ratio is increased along with the expansion ratio as shown by the solid line of FIG. 7 will not differ that much.

If the actual compression ratio is maintained at a low value in this way, knocking will not occur, therefore if raising the expansion ratio in the state where the actual compression ratio is maintained at a low value, the occurrence of knocking can be prevented and the theoretical thermal efficiency can be greatly raised. FIG. 8(B) shows an example of the case when using the variable compression ratio mechanism A and variable valve timing mechanism B to maintain the actual compression ratio at a low value and raise the expansion ratio.

Referring to FIG. 8(B), in this example, the variable compression ratio mechanism A is used to lower the combustion chamber volume from 50 ml to 20 ml. On the other hand, the variable valve timing mechanism B is used to delay the closing timing of the intake valve until the actual stroke volume of the piston changes from 500 ml to 200 ml. As a result, in this example, the actual compression ratio becomes (20 ml+200 ml)/20 ml=11 and the expansion ratio becomes (20 ml+500 ml)/20 ml=26. In the ordinary cycle shown in FIG. 8(A), as explained above, the actual compression ratio is about 11 and the expansion ratio is 11. Compared with this case, in the case shown in FIG. 8(B), it is learned that only the expansion ratio is raised to 26. This is the reason that it is called the "superhigh expansion ratio cycle".

As explained above, generally speaking, in an internal combustion engine, the lower the engine load, the worse the thermal efficiency, therefore to improve the thermal efficiency at the time of vehicle operation, that is, to improve the fuel consumption, it becomes necessary to improve the thermal efficiency at the time of engine low load operation. On the other hand, in the superhigh expansion ratio cycle shown in FIG. 8(B), the actual stroke volume of the piston at the time of the compression stroke is made smaller, so the amount of intake air which can be sucked into the combustion chamber 5 becomes smaller, therefore this superhigh expansion ratio cycle can only be employed when the engine load is relatively low. Therefore, in the present invention, at the time of engine low load operation, the superhigh expansion ratio cycle shown in FIG. 8(B) is set, while at the time of engine high load operation, the ordinary cycle shown in FIG. 8(A) is set.

Next, the operational control as a whole will be roughly explained with reference to FIG. 9.

Figure 9:
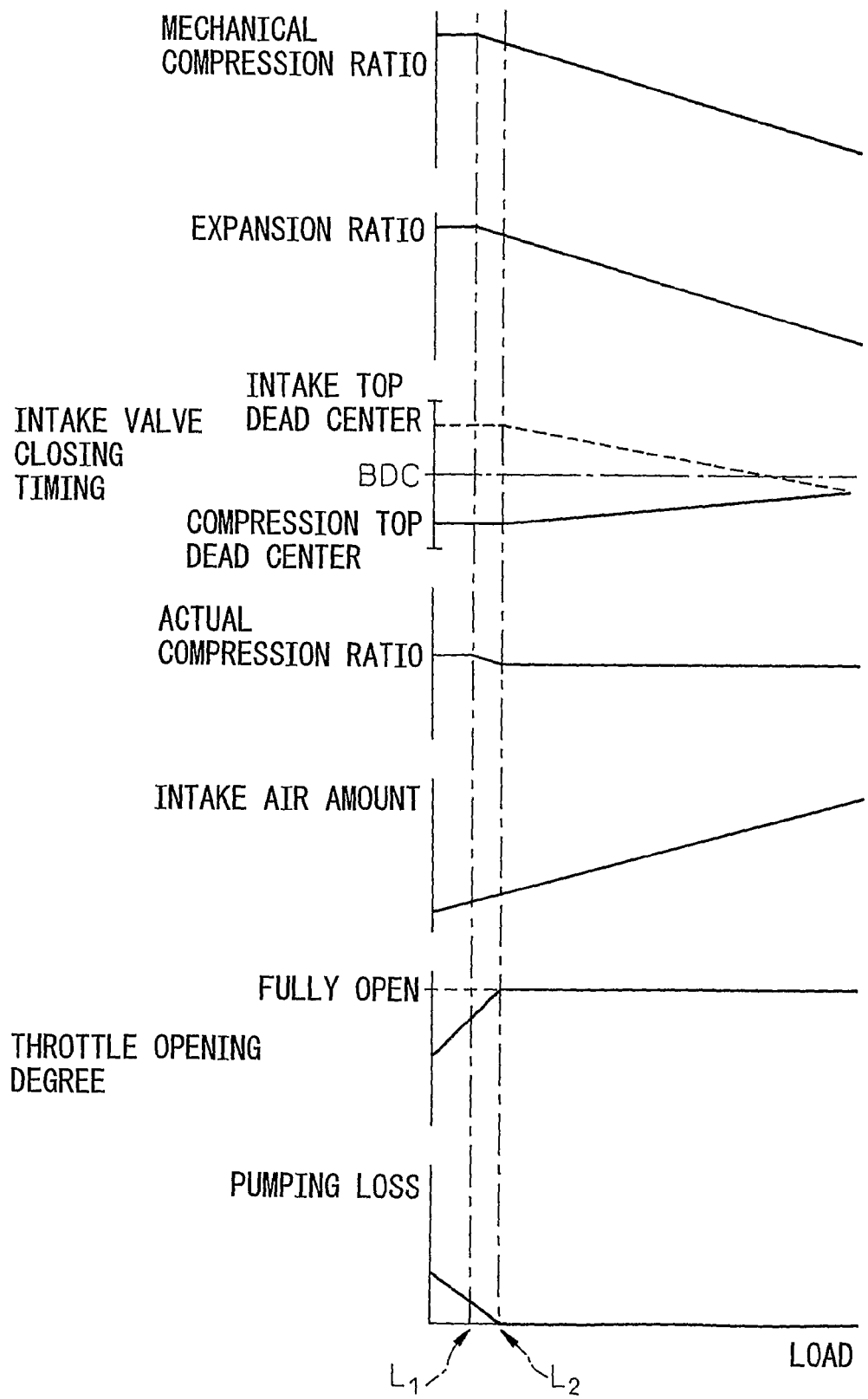
FIG. 9 is a view showing the change in mechanical compression ratio etc. in accordance with the engine load.

FIG. 9 shows the changes in the mechanical compression ratio, expansion ratio, closing timing of the intake valve 7, actual compression ratio, the amount of intake air, opening degree of the throttle valve 17, and pumping loss along with the engine load. Note that in the embodiment according to the present invention, ordinarily the average air-fuel ratio in the combustion chamber 5 is feedback controlled to the stoichiometric air-fuel ratio based on the output signal of the air-fuel ratio sensor 21 so that the three-way catalyst in the catalytic converter 20 can simultaneously reduce the unburned HC, CO, and $NO_x$ in the exhaust gas.

Now, as explained above, at the time of engine high load operation, the ordinary cycle shown in FIG. 8(A) is executed. Therefore, as shown in FIG. 9, at this time, since the mechanical compression ratio is made low, that is, the mechanical compression ratio is made a low compression ratio side, the expansion ratio becomes low, and as shown by the solid line in low in FIG. 9, the closing timing of the intake valve 7 is advanced as shown by the solid line in FIG. 5. Further, at this time, the amount of intake air is large. At this time, the opening degree of the throttle valve 17 is maintained fully opened or substantially fully opened, so the pumping loss becomes zero.

On the other hand, as shown in FIG. 9, along with the reduction in the engine load, the mechanical compression ratio is increased, therefore the expansion ratio is also increased. Further, at this time, the closing timing of the intake valve 7 is delayed as the engine load becomes lower as shown by the solid line in FIG. 9 so that the actual compression ratio is held substantially constant. Note that at this time as well, the throttle valve 17 is held at the fully opened or substantially fully opened state. Therefore the amount of intake air fed to the combustion chamber 5 is controlled not by the throttle valve 17, but by changing the closing timing of the intake valve 7. At this time as well, the pumping loss becomes zero.

In this way when the engine load becomes lower from the engine high load operating state, the mechanical compression ratio is increased along with the fall in the amount of intake air under a substantially constant actual compression ratio. That is, the volume of the combustion chamber 5 when the piston 4 reaches compression top dead center is reduced proportionally to the reduction in the amount of intake air. Therefore the volume of the combustion chamber 5 when the piston 4 reaches compression top dead center changes proportionally to the amount of intake air. Note that at this time, the air-fuel ratio in the combustion chamber 5 becomes the stoichiometric air-fuel ratio, so the volume of the combustion chamber 5 when the piston 4 reaches compression top dead center changes proportionally to the amount of fuel.

If the engine load becomes further lower, the mechanical compression ratio is further increased and becomes a high compression ratio side. When the mechanical compression ratio reaches the limit mechanical compression ratio forming the structural limit of the combustion chamber 5, in the region of a load lower than the engine load $L_1$ when the mechanical compression ratio reaches the limit mechanical compression ratio, the mechanical compression ratio is held at the limit engine compression ratio. Therefore at the time of engine low load operation, the mechanical compression ratio becomes maximum, and the expansion ratio also becomes maximum. Putting this another way, in the present invention, so as to obtain the maximum expansion ratio at the time of engine low load operation, the mechanical compression ratio is made maximum. Further, at this time, the actual compression ratio is maintained at an actual compression ratio substantially the same as that at the time of engine medium and high load operation.

On the other hand, as shown by the solid line in FIG. 9, the closing timing of the intake valve 7 is delayed to the limit closing timing enabling control of the amount of intake air fed to the combustion chamber 5 as the engine load becomes lower. In the region of a load lower than the engine load $L_2$ when the closing timing of the intake valve 7 reaches the limit closing timing, the closing timing of the intake valve 7 is held at the limit closing timing. If the closing timing of the intake valve 7 is held at the limit closing timing, the amount of intake air will no longer be able to be controlled by the change of the closing timing of the intake valve 7. Therefore, the amount of intake air has to be controlled by some other method.

In the embodiment shown in FIG. 9, at this time, that is, in the region of a load lower than the engine load $L_2$ when the closing timing of the intake valve 7 reaches the limit closing timing, the throttle valve 17 is used to control the amount of intake air fed to the combustion chamber 5. However, if using the throttle valve 17 to control the amount of intake air, as shown in FIG. 9, the pumping loss increases.

Note that to prevent this pumping loss, in the region of a load lower than the engine load $L_2$ when the closing timing of the intake valve 7 reaches the limit closing timing, the throttle valve 17 is held in the fully opened or substantially fully opened. In that state, the lower the engine load, the larger the air-fuel ratio may be made. At this time, the fuel injector 13 is preferably arranged in the combustion chamber 5 to perform stratified combustion.

As shown in FIG. 9, at the time of engine low speed, regardless of the engine load, the actual compression ratio is held substantially constant. However, if the engine speed becomes higher, the air-fuel mixture in the combustion chamber 5 is disturbed, so knocking becomes difficult, therefore in the embodiment according to the present invention, the higher the engine speed, the higher the actual compression ratio. On the other hand, as explained above, in the superhigh expansion ratio cycle shown in FIG. 8(B), the expansion ratio is made 26. The higher this expansion ratio, the better, but if 20 or more, a considerably high theoretical thermal efficiency can be obtained. Therefore, in the present invention, the variable compression ratio mechanism A is formed so that the expansion ratio becomes 20 or more.

Further, in the example shown in FIG. 9, the mechanical compression ratio is changed continuously in accordance with the engine load. However, the mechanical compression ratio can also be changed in stages in accordance with the engine load.

On the other hand, as shown by the broken line in FIG. 9, as the engine load becomes lower, by advancing the closing timing of the intake valve 7 as well, it is possible to control the amount of intake air without depending on the throttle valve 17. Therefore, in FIG. 9, if comprehensively expressing both the case shown by the solid line and the case shown by the broken line, in the embodiment according to the present invention, the closing timing of the intake valve 7 is shifted in a direction away from compression bottom dead center BDC, i.e, is caused to be remoted from BDC as the engine load becomes lower until the limit closing timing $L_2$ enabling control of the amount of intake air fed into the combustion chamber.

Next, the startup control of the engine according to the present invention will be explained.

In the present invention, at the time of engine startup, the amount of intake air fed into the combustion chamber 5 is controlled to the necessary amount of intake air by controlling the closing timing of the intake valve 7. Note that, at the time of engine startup, the pressure inside the combustion chamber 5 when the intake valve 7 closes becomes the atmospheric pressure or substantially the atmospheric pressure irrespective of whether the throttle valve 17 is open or closed. Therefore, at this time, the amount of intake air fed into the combustion chamber 5 is governed by the closing timing of the intake valve 7 regardless of whether the throttle valve 17 is opening or closing. Therefore, at the time of engine startup, the throttle valve 17 may be opened or may be closed.

Figure 10:
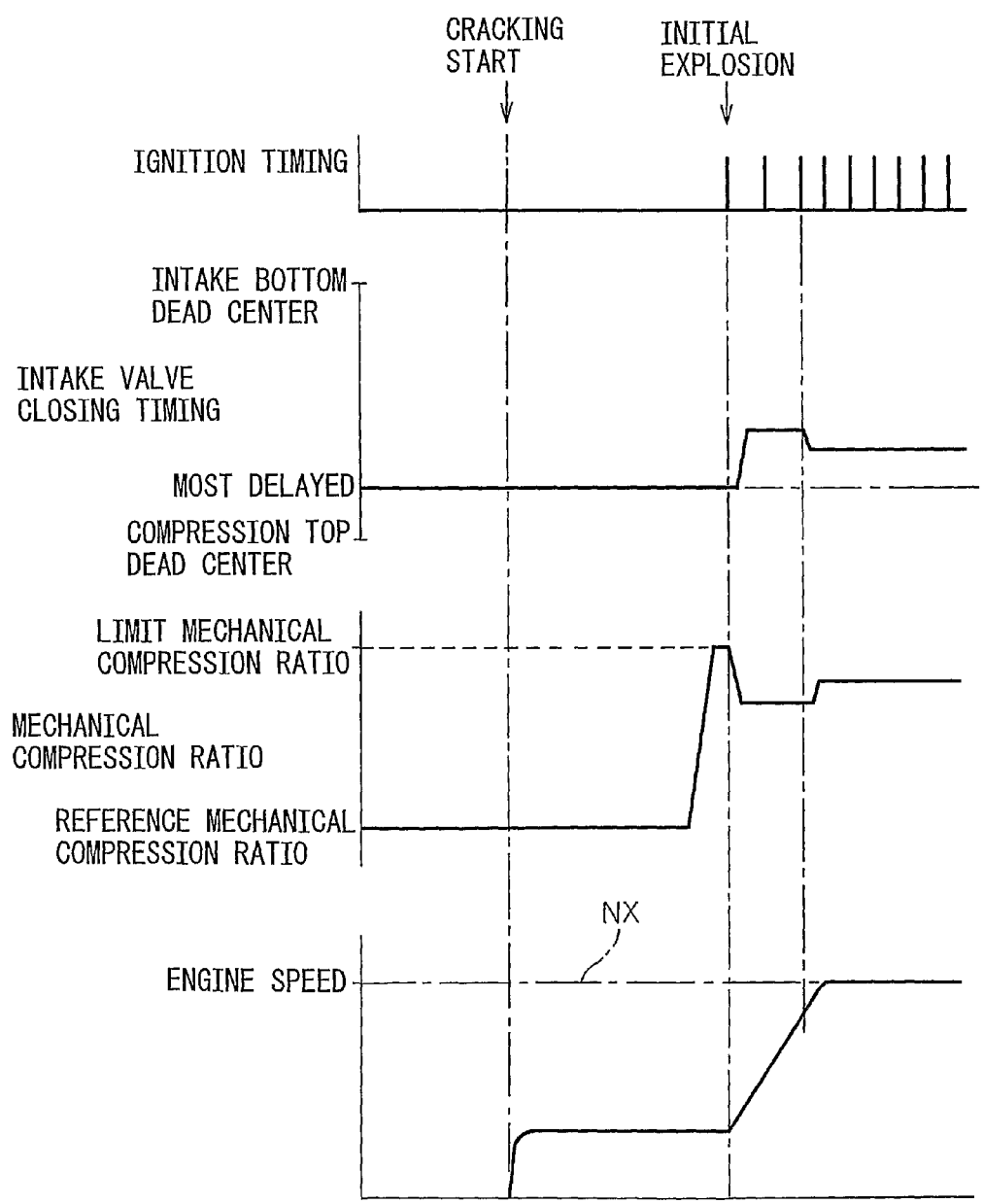
FIG. 10 is a timechart showing the start control.

FIG. 10 is a time chart of an example of engine startup control according to the present invention. This FIG. 10 shows the ignition timing, the change of the closing timing of the intake valve 7, the change of the mechanical compression ratio, and the change of the engine speed. Note that FIG. 10 shows the case where the intake valve 7 is made to close after intake bottom dead center. Therefore, in the example shown in FIG. 10, the more delayed the closing timing of the intake valve 7, the less the amount of intake air fed into the combustion chamber 5. Further, in FIG. 10, NX shows the target idling speed at the time of engine startup. This target idling speed gradually falls as the engine warms up after the completion of engine startup.

Referring to FIG. 10, at the time of engine startup, before the initial explosion, the closing timing of the intake valve 7 is made the most delayed. That is, the closing timing of the intake valve 7 is held at the limit closing timing furthest from intake bottom dead center. On the other hand, the mechanical compression ratio is held at the low compression ratio side as shown by the solid line before cranking is started. Note that, in the example shown by the solid line in FIG. 10, before cranking is started, the mechanical compression ratio is held at the reference mechanical compression ratio of the lowest compression ratio.

Next, even if cranking is started, the mechanical compression ratio is held at the low compression ratio side for a while as shown by the solid line in FIG. 10. In the example shown in FIG. 10, it is held at the reference mechanical compression ratio of the lowest compression ratio. When cranking in this way, if the mechanical compression ratio is held at the low compression ratio side, the actual compression ratio becomes lower, so the drive force of the piston 4 can be reduced and therefore the starter motor can be reduced in size and the power consumption can be reduced.

Next, the mechanical compression ratio is raised from the low compression ratio side to the high compression ratio side before the initial explosion occurs as shown by the solid line in FIG. 10. Note that, at this time, in the example shown in FIG. 10, the mechanical compression ratio is raised to the limit mechanical compression ratio, that is, the maximum compression ratio. Therefore, when the initial explosion occurs, the mechanical compression ratio becomes the high compression ratio side. Note that as shown by the broken line in FIG. 10, the mechanical compression ratio can be held at the high compression ratio side, for example, the limit mechanical compression ratio, that is, the maximum compression ratio, before engine startup.

Now, in the present invention, as shown in FIG. 10, when the initial explosion occurs, the engine speed is raised to the target idling speed NX at the time of engine startup without overshooting the target idling speed NX at the time of engine startup. Next, this will be explained with reference to FIG. 11.

Figure 11:
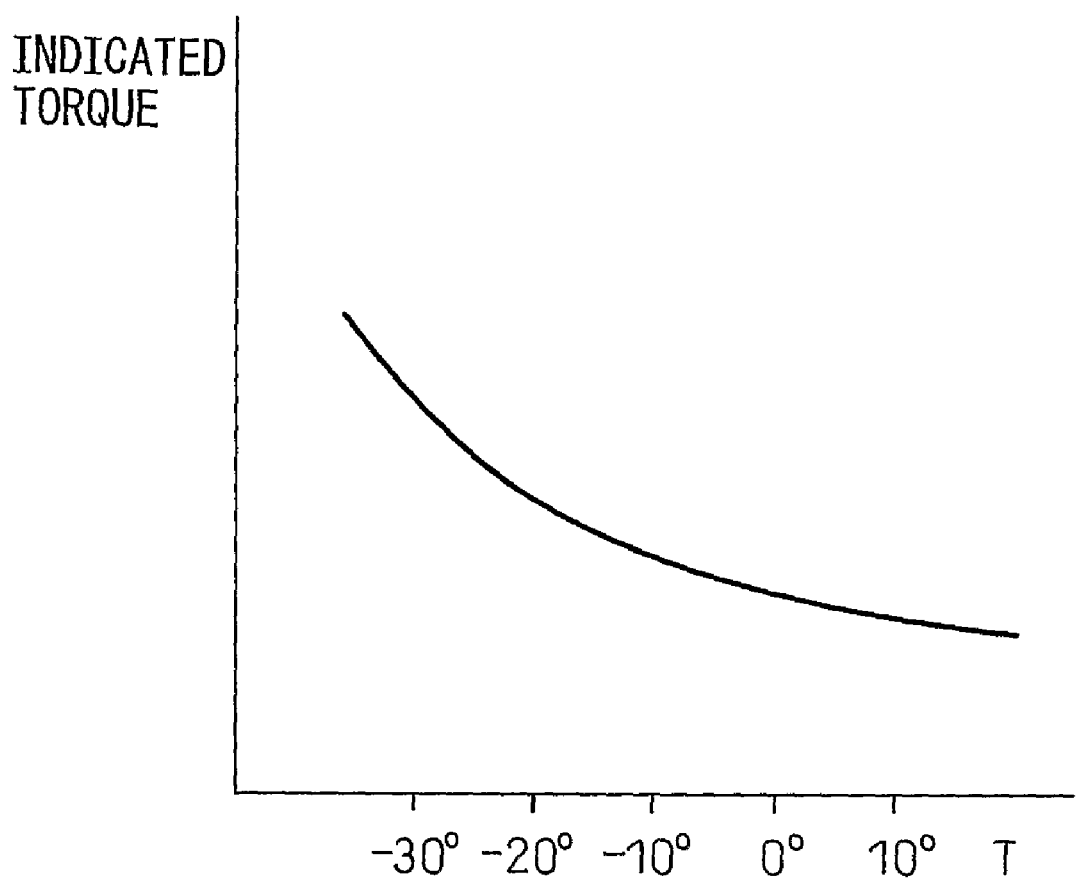
FIG. 11 is a view showing the indicated torque.

FIG. 11 shows the illustrated torque required for holding the engine speed at the target idling speed as a function of the engine cooling water temperature T. In an internal combustion engine, the lower the engine cooling water temperature T, the larger the frictional torque, so as shown in FIG. 11, the illustrated torque becomes higher the lower the engine cooling water temperature.

Now, in an embodiment according to the present invention, the initial explosion occurs in the state where the closing timing of the intake valve 7 is delayed the most and the mechanical compression ratio is made the maximum compression ratio. At this time, the mechanical compression ratio is made the maximum compression ratio, so the actual compression ratio is high. Therefore, good ignition and combustion are performed. However, the amount of intake air fed into the combustion chamber 5 is extremely small, so the illustrated torque at this time becomes lower than the illustrated torque shown in FIG. 11. In this case, to raise the engine speed to the target idling speed NX at the time of engine startup, an indicated torque larger than the indicated torque shown in FIG. 11 becomes necessary.

Therefore, when the initial explosion occurs, the closing timing of the intake valve 7 is advanced as shown in FIG. 10 so as to increase the amount of intake air fed into the combustion chamber 5 so as to generate an indicated torque larger than the indicated torque shown in FIG. 11. That is, the closing timing of the intake valve 7 is made to approach intake bottom dead center. On the other hand, if the closing timing of the intake valve 7 is advanced, the mechanical compression ratio is lowered so that the actual compression ratio does not become excessively high.

The closing timing of the intake valve 7 and mechanical compression ratio at this time are made the closing timing of the intake valve 7 and mechanical compression ratio so that the engine speed rises to the target idling speed NX without overshooting. The closing timing of the intake valve 7 and mechanical compression ratio by which the engine speed rises to the target idling speed NX without overshooting are found in advance by experiments and stored in advance in the ROM 32.

On the other hand, when the closing timing of the intake valve 7 is advanced and the mechanical compression ratio is reduced in this way, if the action of reducing the mechanical compression ratio is delayed from the action of advancing the closing timing of the intake valve 7, the actual compression ratio will end up becoming abnormally high. Therefore, in an embodiment according to the present invention, at this time, the action of lowering the mechanical compression ratio is performed with priority over the action of delaying the closing timing of the intake valve 7.

When the engine speed reaches the target idling speed NX at the time of engine startup, if then controlling the closing timing of the intake valve 7 so as to obtain the amount of intake air giving the indicated torque shown in FIG. 11, the engine speed is held at the target idling speed. Therefore, as shown in FIG. 10, when the engine speed is raised to the target idling speed NX at the time of engine startup, the closing timing of the intake valve 7 is delayed to maintain the engine speed at the target idling speed NX. At this time, the action of increasing the mechanical compression ratio is performed somewhat delayed from the action of delaying the closing timing of the intake valve 7.

FIG. 12 shows the startup control routine.

Referring to FIG. 12, first, at step 100, whether an instruction to start up the engine is issued is judged. For example, when the starter switch is turned on and cranking is started, it is judged that an engine startup instruction has been issued. Next, at step 101, the method of raising the engine speed, that is, whether to rapidly raise the engine speed or slowly raise the engine speed, is set in accordance with the operating state of the engine.

Next, at step 102, the engine cooling water temperature, the pressure in the surge tank 12, the engine speed, and other engine operating conditions are read. Next, at step 103, the target amounts of intake air at the time of the initial explosion, the time of the second explosion, the time of the third explosion, etc. are calculated based on the set method of rise of the engine speed. Next, at step 104, the target closing timing of the intake valve 7, target mechanical compression ratio, and ignition timing at the time of the initial explosion, the time of the second explosion, etc. are calculated based on the target amount of intake air and engine operating state.

Next, at step 105, processing is performed to change the mechanical compression ratio to the target compression ratio. Next, at step 106, whether the action of changing the mechanical compression ratio to the target compression ratio has been completed is judged. When completed, the routine proceeds to step 107 where processing is performed to change the closing timing of the intake valve 7 to the target closing timing. Next, at step 108, whether the startup control has ended is judged. When startup control has ended, the routine shifts to idling operation control after completion of startup.

The invention claimed is:

1. A method of operating a spark ignition type internal combustion engine provided with a variable timing mechanism able to control a closing timing of an intake valve and a variable compression ratio mechanism able to change a mechanical compression ratio, wherein at the time of engine startup, the closing timing of the intake valve is controlled so that the amount of intake air required for startup is fed to the inside of the combustion chamber, and the mechanical compression ratio is made the high compression ratio side.

2. A method of operating a spark ignition type internal combustion engine as set forth in claim 1, wherein at the time of engine startup, the closing timing of the intake valve is held at the limit closing timing furthest from intake bottom dead center until the initial explosion occurs.

3. A method of operating a spark ignition type internal combustion engine as set forth in claim 1, wherein the closing timing of the intake valve is made to approach intake bottom dead center while the engine speed rises to the target idling speed after the initial explosion.

4. A method of operating a spark ignition type internal combustion engine as set forth in claim 1, wherein at the time of engine startup, the mechanical compression ratio is made the low compression ratio side when the cranking is started and the engine compression ratio is raised from the low compression ratio side to the high compression ratio side before the initial explosion occurs.

5. A method of operating a spark ignition type internal combustion engine as set forth in claim 1, wherein the mechanical compression ratio is held at the high compression ratio side before engine startup.

6. A method of operating a spark ignition type internal combustion engine as set forth in claim 1, wherein at the time of engine startup, the mechanical compression ratio is made the maximum compression ratio.

7. A method of operating a spark ignition type internal combustion engine as set forth in claim 1, wherein when the initial explosion occurs, the mechanical compression ratio is then reduced.

\* \* \* \* \*